(12) United States Patent
Kaidi

(10) Patent No.: US 11,363,039 B2
(45) Date of Patent: Jun. 14, 2022

(54) DETECTION OF DATA LEAKS USING TARGETED SCANNING

(71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 35 days.

(21) Appl. No.: 16/663,568

(22) Filed: Oct. 25, 2019

(65) Prior Publication Data
US 2021/0126926 A1  Apr. 29, 2021

(51) Int. Cl.
*H04L 9/40*  (2022.01)
*H04L 67/01*  (2022.01)
*H04L 43/08*  (2022.01)
*G06F 21/60*  (2013.01)

(52) U.S. Cl.
CPC .......... *H04L 63/1416* (2013.01); *G06F 21/60* (2013.01); *H04L 43/08* (2013.01); *H04L 63/20* (2013.01); *H04L 67/42* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,181,036 B1 * | 5/2012 | Nachenberg | ........ | H04L 63/1416 709/224 |
| 9,021,389 B1 * | 4/2015 | Torney | ................ | G06F 21/6218 726/26 |
| 9,369,433 B1 * | 6/2016 | Paul | ........................ | H04L 63/20 |
| 9,882,935 B2 * | 1/2018 | Barday | ................... | H04L 63/04 |
| 10,193,855 B2 | 1/2019 | Boutnaru | | |
| 10,360,402 B2 * | 7/2019 | Farkash | ................ | H04L 9/0643 |
| 10,440,049 B2 | 10/2019 | Boutnaru et al. | | |
| 2011/0138467 A1 * | 6/2011 | Macwan | ............... | G06F 21/554 726/24 |

(Continued)

OTHER PUBLICATIONS

Data Leak Protection Notes; Mimecast, https://www.mimecast.com/content/data-leak-protection/; 3 pages. [Retrieved Oct. 21, 2019].

(Continued)

*Primary Examiner* — Harris C Wang
(74) *Attorney, Agent, or Firm* — Kowert, Hood, Munyon, Rankin & Goetzel, P.C.

(57) ABSTRACT

Techniques are disclosed relating to detecting data leaks using targeted scanning. For example, in various embodiments, a scanner module may monitor communications between a user device and a server system, where the user device requests access to a resource provided via the server system. The scanner module may perform various data loss prevention operations to detect the leaking of sensitive data associated with an organization. For example, the scanner module may perform an initial scan of the resource to capture an initial version of the resource at an establishment of a connection between the user device and the server system. The scanner module may perform a subsequent scan that captures a subsequent version of the resource. Based on the initial and subsequent versions of the resource, the scanner module may determine whether any data loss prevention rules have been violated and, if so, initiate one or more corrective actions.

20 Claims, 8 Drawing Sheets

(56) References Cited

U.S. PATENT DOCUMENTS

| | | | | |
|---|---|---|---|---|
| 2013/0205392 | A1* | 8/2013 | Macwan | G06F 21/554 726/23 |
| 2013/0227714 | A1* | 8/2013 | Gula | H04L 63/1408 726/32 |
| 2014/0165137 | A1* | 6/2014 | Balinsky | H04L 63/20 726/1 |
| 2014/0173739 | A1* | 6/2014 | Ahuja | H04L 63/1433 726/25 |
| 2015/0261940 | A1* | 9/2015 | Roundy | G06F 21/10 726/26 |
| 2016/0127417 | A1* | 5/2016 | Janssen | H04L 63/1433 726/1 |
| 2018/0007073 | A1 | 1/2018 | Boutnaru | |
| 2018/0181769 | A1* | 6/2018 | Vora | H04L 63/105 |
| 2019/0124122 | A1* | 4/2019 | Barday | G06Q 10/06 |
| 2019/0199533 | A1 | 6/2019 | Boutnaru | |
| 2020/0167498 | A1* | 5/2020 | Pridgen | G06F 21/6245 |

OTHER PUBLICATIONS

Introducing dumpmon: A Twitter-bot that Monitors Paste-Sites for Account/Database Dumps and Other Interesting Content; RaiderSec, https://raidersec.blogspot.com/2013/03/introducing-dumpmon-twitter-bot; 4 pages. [Retrieved Oct. 22, 2019].

Collection of github dorks and helper tool to automate the process of checking dorks; GitHub—techgaun/github-dorks https://github.com/techgaun/github-dorks; 6 pages. [Retrieved Oct. 21, 2019].

Asaf Nadler, et al., "Introduction to DNS Data Exfiltration," https://blogs.akamai.com/2017/09/introduction-to-dns-data-axfiltration.html, udpated Feb. 14, 2019; 4 pages. [Retrieved Oct. 7, 2019].

Data Loss Prevention & Protection; Symantec, https://www.symantec.com/products/data-loss-prevention, 10 pages. [Retrieved Oct. 21, 2019].

Daniela Perlmutter, "What You Need to Know About Code Repository Threats," https://blog.cyberint.com/what-you-need-to-know-about-code-repository-...1; 4 pages. [Retrieved Sep. 27, 2019].

Blumonkeydev. Why You Should Tap into the Deep Web in 2014—BrightPlanet, https://brightplanet.com/2014/01/07/why-you-should-tap-into-the-deep-...1; 4 pages [Retrieved Oct. 18, 2019].

* cited by examiner

500

```
┌─────────────────────────────────────────────────────────────────────────┐
│ Monitor communications, between a user device and a server system, in   │
│ which the user device requests access to a first resource provided via  │
│ the server system                                                       │
│ 502                                                                     │
└─────────────────────────────────────────────────────────────────────────┘
                                     │
                                     ▼
┌─────────────────────────────────────────────────────────────────────────┐
│ In response to detecting a triggering event associated with the         │
│ communications between the user device and the server system, perform   │
│ data loss prevention operations that include:                           │
│ 504                                                                     │
└─────────────────────────────────────────────────────────────────────────┘
                                     │
                                     ▼
┌─────────────────────────────────────────────────────────────────────────┐
│ Performing an initial scan of the first resource, where the initial     │
│ scan captures an initial version of the first resource                  │
│ 506                                                                     │
└─────────────────────────────────────────────────────────────────────────┘
                                     │
                                     ▼
┌─────────────────────────────────────────────────────────────────────────┐
│ Performing a subsequent scan that captures a subsequent version of      │
│ the first resource                                                      │
│ 508                                                                     │
└─────────────────────────────────────────────────────────────────────────┘
                                     │
                                     ▼
┌─────────────────────────────────────────────────────────────────────────┐
│ Based on the initial and subsequent scans, determining whether any      │
│ of a set of data loss prevention rules were violated                    │
│ 510                                                                     │
└─────────────────────────────────────────────────────────────────────────┘
                                     │
                                     ▼
┌─────────────────────────────────────────────────────────────────────────┐
│ In response to one or more of the set of data loss prevention rules     │
│ being violated, initiate one or more corrective actions                 │
│ 512                                                                     │
└─────────────────────────────────────────────────────────────────────────┘
```

```
Based on the initial and subsequent scans, determining whether any of a set of
data loss prevention rules were violated
510
           │
           ▼
Perform a hash function on a portion of the initial version of the first
resource to generate a first hash value
602
           │
           ▼
Perform a hash function on a portion of the subsequent version of the
first resource to generate a second hash value
604
           │
           ▼
Compare the first and second hash values to determine whether the
first resource was modified with content added by a user of the user
device during a connection between the user device and the server
computer system
606
           │
           ▼
In response to detecting that the first resource was modified during
the connection, parse the subsequent version of the first resource to
determine whether the subsequent version was modified to include
sensitive data
608
```

```
┌─────────────────────────────────────────────────────────────────────────┐
│ Receive information indicative of network activity of a user device,    │
│ where the network activity includes one or more DNS requests, sent by   │
│ the user device, associated with a first domain                         │
│                               702                                        │
└─────────────────────────────────────────────────────────────────────────┘
                                    ↓
┌─────────────────────────────────────────────────────────────────────────┐
│ Perform data loss prevention operations where, for a given DNS request, │
│ the data loss prevention operations include:                            │
│                               704                                        │
└─────────────────────────────────────────────────────────────────────────┘
                                    ↓
┌─────────────────────────────────────────────────────────────────────────┐
│ Scan a subdomain of the given DNS request to determine whether the      │
│ subdomain includes any data from a particular set of sensitive data     │
│                               706                                        │
└─────────────────────────────────────────────────────────────────────────┘
                                    ↓
┌─────────────────────────────────────────────────────────────────────────┐
│ In response to determining that the subdomain of the given DNS request  │
│ includes sensitive data, initiating one or more corrective actions      │
│                               708                                        │
└─────────────────────────────────────────────────────────────────────────┘
```

DETECTION OF DATA LEAKS USING TARGETED SCANNING

BACKGROUND

Technical Field

This disclosure relates generally to computer system security, and more particularly to security techniques, including targeting scanning, that are usable with web-related technologies to detect sensitive data leaks, according to various embodiments.

Description of the Related Art

Public exposure of sensitive data, either through inadvertent or intentional disclosure, is a serious problem for many organizations. In many instances, remediating a leak of sensitive data can require a significant amount of time and effort. In some instances, data leaks can be remediated by updating or modifying the sensitive data that has been exposed. For example, in an instance in which user authentication credentials have been exposed, the affected credentials may be invalidated and new credentials created to replace them. In other instances, however, it may be impossible or infeasible to remediate the exposure of sensitive data. For example, some types of sensitive data are difficult or impossible to change even after a known exposure, such as authentication password patterns, code bases, database table names or schema, etc. In many instances, the exposure of such sensitive data can compromise the security of an organization and its systems. Applicant recognizes that detecting and remediating leaks of sensitive data is desirable for improving computer system security and functionality.

BRIEF DESCRIPTION OF THE DRAWINGS

FIG. 5 is a flow diagram illustrating an example method for detecting data leaks using targeted scanning, according to some embodiments.

FIG. 6 is a flow diagram illustrating an example method for determining whether any of a set of data loss prevention rules have been violated, according to some embodiments.

FIG. 7 is a flow diagram illustrating an example method for detecting data leaks using targeted scanning of DNS requests, according to some embodiments.

DETAILED DESCRIPTION

Figure 1:
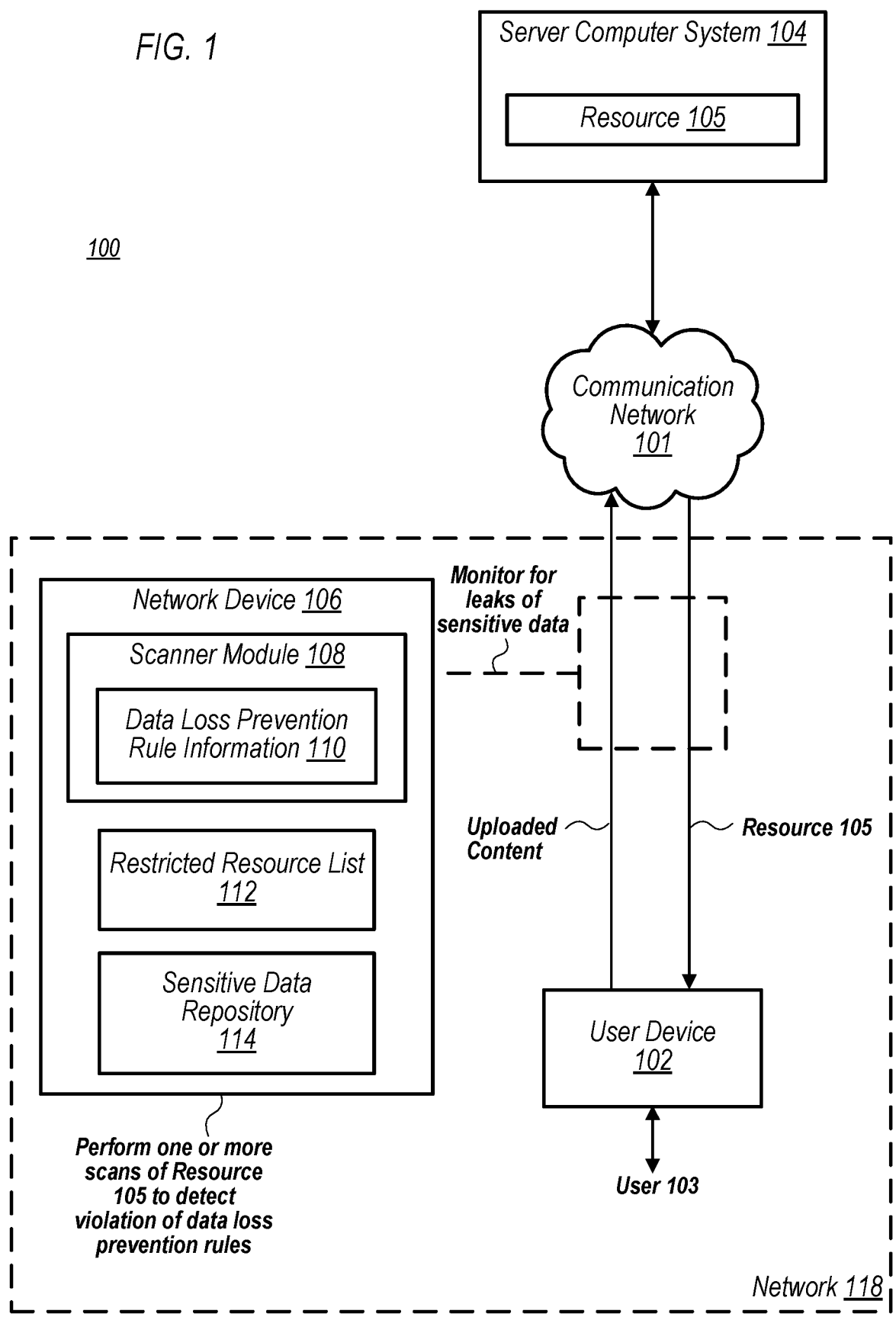
FIG. 1 is a block diagram illustrating a system for detecting data leaks using targeted scanning, according to some embodiments.

The leaking of sensitive data, either through inadvertent or intentional disclosure, is a prevalent problem for organizations. It is often very expensive to remediate a leak of sensitive data. In some instances, data leaks can be remediated by updating or modifying the sensitive data that has been exposed. For example, in an instance in which user authentication credentials have been exposed, the affected credentials may be invalidated and new credentials created to replace them. In other instances, however, it may be impossible or infeasible to remediate the exposure of sensitive data. For example, some types of sensitive data are difficult or impossible to change even after a known exposure, such as authentication password patterns, code bases, database table names or schema, etc. In many instances, the exposure of such sensitive data can compromise the security of an organization and its systems. As one non-limiting example, consider an instance in which information regarding a particular database, such as one or more database table names or schema, are publicly exposed. In such an instance, this data leak may cause the organization to be more susceptible to certain types of cyber-attacks, such as SQL injection attacks. Thus, in many cases, the leaking of sensitive data can have long-lasting detrimental consequences for the organization and the security of its systems.

Some approaches to detecting and preventing data leaks present various technical shortcomings. An organization may use a "scraping" service that attempts to detect data leaks by scanning content on the Internet for sensitive data, for example. There are various technical problems associated with such an approach. First, attempts to scan the entire Internet, or large portions thereof, are inefficient, requiring significant time and computational resources. Second, due to the scale and time required to perform such a scan, these scraping services may take a long time to actually detect the leak of sensitive data. This, in turn, may result in the sensitive data being publicly exposed for a longer period of time, increasing the likelihood that it will be obtained by unauthorized persons. Third, these scraping services often search only through the "crawlable" web, which may cause these services to fail to detect leaks of sensitive data that occur on websites for which crawling or indexing has been disallowed. Fourth, if a scraping service is externally based, the organization is required to expose it sensitive data to this third-party service so that it may be used in the scan. That is, external scraping services rely on the sensitive data and structures thereof that the organization provides. Providing sensitive data to a third-party service, however, presents a significant data security risk in itself in the event that the third-party service is subject to its own data breach. Thus, by providing this third-party with a repository of sensitive data, the organization may be jeopardizing the very sensitive data that it was attempting to protect. Fifth, such systems rely on the organization to constantly update the corpus of sensitive data, requiring significant time and effort on the part of the organization and resulting in less effective detection of data leaks in the event that the corpus of sensitive data used for the scan is not up-to-date.

In various embodiments, the disclosed systems and methods solve these and other technical problems by detecting data leaks using targeted scanning with particular initialization mechanisms. For example, in some embodiments, the disclosed techniques may include monitoring the network activity of a user of an organization, such as the web resources the user accesses, and performing one or more targeted scans for the organization's sensitive data based on this network activity. When a user first accesses a webpage, the disclosed system may perform an initial scan of the page to determine whether any of the organizations sensitive data is present on the page. In some embodiments, this initial scan may capture an initial version of the webpage as it exists at an establishment of the connection between the user device and the server system hosting the webpage.

As the user views and interacts with the webpage, the disclosed system may additionally monitor one or more communications (e.g., including packet payloads) between the user device and the server system to determine whether communications from the user device include any items of sensitive data. Further, in some embodiments, the disclosed system may perform a subsequent scan (e.g., after a predetermined period of time, at the termination of the user session, after a user is detected as taking an action on the page that allows content to be uploaded, etc.) that captures a subsequent version of the first resource. In particular, this subsequent scan does not rely on data packet scanning in some embodiments—rather, content of the page itself that the user is browsing can simply be compared before and after to see if newly changed content on the page represents sensitive data uploaded by the user.

Based on the initial and subsequent scans, the disclosed techniques may determine whether any data loss prevention rules of the organization were violated and, if so, initiate an appropriate corrective action. In various embodiments, the disclosed techniques enable detection of data leaks in a way that is faster, more effective, and more secure than prior attempted solutions. Thus, in various embodiments, the disclosed systems and methods may improve data security for an organization and its systems, thereby improving the functioning of the system as a whole.

In various embodiments, disclosure of sensitive data may be due to the activities of the user (either through intentionally or inadvertently sending sensitive data to an external system) or through malicious software (e.g., malware) resident on the user device that is operable to covertly send sensitive data to an external system. In some embodiments, the leak of sensitive data may include the posting or uploading of one or more items of sensitive data to a resource, such as a webpage, repository, forum, etc. Various embodiments for detecting and remediating data leaks in these instances are described in more detail below with reference to FIGS. 1-2 and 5-6. In other embodiments, exposure of sensitive data may occur through a technique known as "DNS data exfiltration," in which items of sensitive data are leaked as part of a subdomain in a DNS request to a domain of a malicious party. Various embodiments for detecting and remediating data leaks in such instances are described below with reference to FIGS. 3, 4A-4B, and 6.

Referring now to FIG. 1, a block diagram illustrating a system 100 for detecting data leaks using targeted scanning is depicted, according to some embodiments. In the embodiment of FIG. 1, system 100 includes user device 102, server computer system 104, and network device 106. In various embodiments, user 103 may belong to an organization 120 (e.g., a company, a school or university, etc.) and use user device 102 to access various web resources. In FIG. 1, network device 106 includes scanner module 108, restricted resource list 112, and sensitive data repository 114. In various embodiments, network device 106 may be any of various types of computer systems associated with the organization 120, such as a proxy server.

In various embodiments, scanner module 108 is operable to monitor actions taken by the user device 102, including communications transmitted by the device, and to and detect leaks of sensitive data associated with the organization 120. In some embodiments, scanner module 108 is implemented on network device 106, but in other embodiments, all or a portion of scanner module 108 may be implemented within user device 102 as well. Actions taken on the client device (e.g. clicking an upload button) may be monitored by scanner module 108 to determine if a user is possibly modifying a resource such as a web page. Such an action may be considered a triggering event (discussed below). All or a portion of network traffic from or to user device 102 may also be monitored to see if a user may be modifying a resource, and detecting certain network traffic is also a triggering event, in some embodiments.

In various embodiments, scanner module 108 may monitor all network traffic that goes out of the organization 120's network 118, whether the user device is on- or off-premises. In some embodiments, for instance, user device 102 may be a computer system that belongs to the organization 120 and is located on the premises of the organization 120. In other embodiments, user device 102 may be a personal device (e.g., a laptop or smart phone belonging to user 103) connected to the organization 120's network 118 on-premises (e.g., via on-site Wi-Fi). In still other embodiments, user device 102 may be located off-premises from the organization 120. For example, user device 102 may be a personal device of the user 103 and the user 103 may connect to the network 118 of the organization 120 using a VPN. In any of these instances, the network traffic out of the network 118 may go through a proxy server (e.g., network device 106), according to various embodiments. In other embodiments, user device 102 may be computer system provided by the organization 120 for use by the user 103. In such embodiments, user device 102 may include a proxy agent on the machine that is operable to monitor network activity of the user device 102 (e.g. a portion of scanner module 108 may operate on user device 102). Thus, in various embodiments, scanner module 108 is operable to monitor all network traffic associated with the network 118.

Network device 106 further includes (or has access to) sensitive data repository 114, which includes various items of sensitive data for associated with the organization 120, according to various embodiments. As used herein, the term "sensitive data" refers to any of various types of information that an organization attempts to maintain in confidence and that are not intended to be generally accessible to the public. Non-limiting examples of such sensitive data include program code, authentication credentials, trade secrets or other confidential information of the organization 120, credit card numbers or other financial information, personal information (e.g., email addresses, phone numbers, addresses, Social Security numbers, etc.) of users or employees, etc. Further, in some embodiments, sensitive data could include information corresponding to the organization 120 itself or its systems, such as database table structures and names, database schema, patterns of sensitive data, data structures, etc. In various disclosed embodiments, sensitive data repository 114 includes some or all of the items of sensitive data for which the scanner module 108 will perform targeted scans to detect instances of outside disclosure of the organization 120's sensitive data. In FIG. 1, network device 106 further includes (or has access to) restricted resource list 112, which, in various embodiments, is a list of resources (e.g., websites or webpages) that have been identified as presenting an increased risk for potential leaks of sensitive data, either intentionally or inadvertently. Non-limiting examples of such restricted resources may include software development version control websites (such as GitHub), text storage sites (such as Pastebin.com), or public forum sites (such as StackOverflow or Reddit). Note that, in some embodiments, one or both of restricted resource list 112 and sensitive data repository 114 may be stored on one or more storage devices separate from and accessible to network device 106.

In various embodiments, when user device 102 sends a request to access resource 105 hosted by server computer system 104, that request is sent through the organization 120's outbound proxy server or other network devices (e.g., network device 106), which may capture both the domain name and the uniform resource identifier ("URI") associated with the resource 105. In various embodiments, scanner module 108 may monitor network traffic and perform one or more scans to detect leaks of sensitive data by the user 103 or the user device 102. For example, in various embodiments, scanner module 108 may perform one or more data loss prevention operations in response to detecting a triggering event. As used herein, the term "triggering event" refers to an occurrence that, in response to its detection, scanner module 108 performs one or more data loss prevention operations. One non-limiting example of a triggering event includes the user device 102 accessing a resource that is included in the restricted resource list 112. So, for example, if resource 105 accessed by user device 102 is included in the restricted resource list 112, scanner module 108 may treat the accessing of resource 105 as a triggering event and perform one or more data loss prevention operations. Another non-limiting example of a triggering event includes an attempt by user device 102 to upload content belonging to a monitored category of content, such as text, an image, or a video file. For example, data loss prevention rule information 110 may specify certain categories of content that, if uploaded by a user, constitute a triggering event that causes scanner module 108 to initiate one or more data loss prevention operations, regardless of the resource to which the content was uploaded. Non-limiting examples of restricted categories of content may include images, videos, code snippets (e.g. text including one or more statements formatted in such a way as to be identifiable as belonging to one or more programming languages), audio files, or any of various other categories of content deemed by the organization 120 as having an increased likelihood of including sensitive data. In various embodiments, data loss prevention rule information 110 may include definitions for one or more triggering events, and scanner module 108 may monitor communications on network 118 to detect the occurrence of any such events. Note, however, that in various embodiments, scanner module 108 may perform one or more data loss prevention operations prior to, or independent of, the detection of a triggering event. For example, in some embodiments, scanner module 108 may perform an initial scan of all (or some) of the webpages visited by devices on network 118 to determine if those webpages include input elements (e.g., HTML forms) that user 103 may use to add content to the resource 105.

In various embodiments, in association with the user device 102 requesting to access resource 105, the scanner module 108 performs an initial scan of the resource 105. This initial scan may be performed concurrent with the user's access request or shortly after, in some embodiments. In other embodiments the initial scan could even be performed before the user's access request (e.g. a web page could have been scanned previously and some version of the scan results cached).

In some embodiments, performing this initial scan may include determining initial contents of the resource, for purposes of making a later comparison to see if the user uploaded sensitive data via the resource. The initial scan can also include parsing at least a portion of the resource 105 to determine whether resource 105 includes any data from the sensitive data repository 114 (e.g. if sensitive data is already present on the page). For example, in instances in which resource 105 is a webpage, scanner module 108 is operable to parse the webpage for content that matches the data included in sensitive data repository 114, as discussed in more detail below with reference to FIG. 2.

In various embodiments, this initial scan may include capturing an initial version of resource 105 as it exists at the time that the connection between user device 102 and the server computer system 104 is established (or within a specific amount of time before or after the user device establishes a connection). For example, in some embodiments, scanner module 108 may save the initial version of resource 105 in a local memory. In various embodiments, this stored initial version of resource 105 may serve as a benchmark against which a subsequent version of resource 105 may be compared, as explained in more detail below. It is not necessary to save an entire version in some instances; it may be possible to perform a hash (or multiple hashes) on one or more portions of the resource. For example, if a web page a user requested had 10 megabytes of content on it, it would be possible to take 10 different hashes of 1 MB each of the content. Later hashes could determine if content changes after the user took an action on the web page. Note that, in some embodiments, the initial scan may be performed any time a resource is accessed by user device 102. For example, in some embodiments, scanner module 108 may perform an initial scan of the resources accessed by devices on network 118 to determine if there is an HTML element that will allow text or other content (e.g., a file, image, video, etc.) to be uploaded. In such embodiments, this initial scan may be performed regardless of whether a triggering event has occurred.

Further, in various embodiments, while the user 103 views or interacts with the resource 105, scanner module 108 may monitor communications between the user device 102 and the server computer system 104 for items of sensitive data. For example, while the connection is ongoing, this second, continuous monitoring scan may be performed on the network layer, scanning any requests, responses, and payloads that may include sensitive data, as discussed in more detail below with reference to FIG. 2.

In various embodiments, scanner module 108 may further perform a subsequent scan at a later point in the connection between user device 102 and the server computer system 104. As noted above, for example, scanner module 108 may perform the subsequent scan at a particular time after the initial scan was performed (e.g., 10 seconds, one minute, five minutes, 10 minutes, or some other greater or lesser amount of time). Further, in some embodiments, the subsequent scan may be performed in response to an action, such as the termination of the connection between user device 102 and server computer system 104. For example, in some embodiments, the subsequent scan may be triggered at the termination of an HTTP session between the user device 102 and the server computer system 104, e.g., due to a timing out of the session or a closing of the browser or tab by the user 103.

In various embodiments, the subsequent scan performed by the scanner module 108 may capture a subsequent version of the resource 105 (or capture the fact that the resource had changed, e.g. via hashing some or all portions of the resource). Based on the initial and subsequent scans, scanner module 108 may determine what changes, if any, have been made to the resource 105 during the connection with the user device 102. As described in more detail below with reference to FIG. 2, scanner module 108 may determine whether any of a set of data loss prevention rules were violated while user device 102 accessed resource 105. For example, scanner module 108 may compare the initial and subsequent versions of the resource 105 to determine if any changes were made to the webpage. If so, scanner module 108 may compare any content added to resource 105 to the data in sensitive data repository 114 to determine whether this uploaded content includes sensitive data of the organization 120.

For example, as shown in FIG. 1, scanner module 108 may include (or have access to) data loss prevention rule information 110 that specifies one or more data loss prevention rules for the organization 120. In various embodiments, if scanner module 108 determines that one or more of the data loss prevention rules have been violated, it may initiate one or more corrective actions. In various embodiments, these corrective actions may include various actions designed to remediate the leak of sensitive data or mitigate the harm caused by such leaks. As non-limiting examples, the corrective actions may include one or more of the following: notifying one or more parties associated with the user 103 (e.g., the user 103's manager or team leader, an incident response team in the organization 120, etc.), initiating the removal of the leaked sensitive data from the resource 105, terminating the connection between user device 102 and the server computer system 104, invalidating the leaked sensitive data (e.g., rotating exposed authentication credentials, invalidating credit card CVV values, etc.), incrementing a counter (e.g., a flag) of potential sensitive data leaks, etc. Note, however, that these corrective actions are listed merely as examples and are not intended to limit the scope of the present disclosure. In other embodiments, scanner module 108 may initiate any of various other suitable corrective actions in response to detecting the violation of one or more data loss prevention rules.

Note that, in various embodiments, the scanner module 108 detects leaks of sensitive data by performing targeted scans that are triggered in response to specific actions taken by a user at risk of leaking sensitive data, which presents various technical benefits. For example, consider the third-party "scraping" services discussed above. In such services, data leaks are detected by scanning all of, or a significant portion of, the crawlable Internet for instances of an organization's sensitive data. These broad based scans present various technical shortcomings, as noted above. For example, the non-targeted scans of such systems are time-consuming, resulting in sensitive data being publicly exposed for a longer period of time and increasing the likelihood that the leaked sensitive data will be obtained by a malicious third-party. In various embodiments, however, scanner module 108 has access to the network activity of the devices on network 118, information that is not publicly available to third parties (e.g., scraping services). This network activity information enables the scanner module 108 to target its scans to resources (e.g., websites) that are the most likely place for a data leak to occur—the resources accessed by the users on network 118, whether these resources are crawlable or not. As noted above, this targeted scanning enables various disclosed embodiments to detect leaked sensitive data in a way that is faster and more effective than prior techniques, improving the data security of the organization 120.

Figure 2:
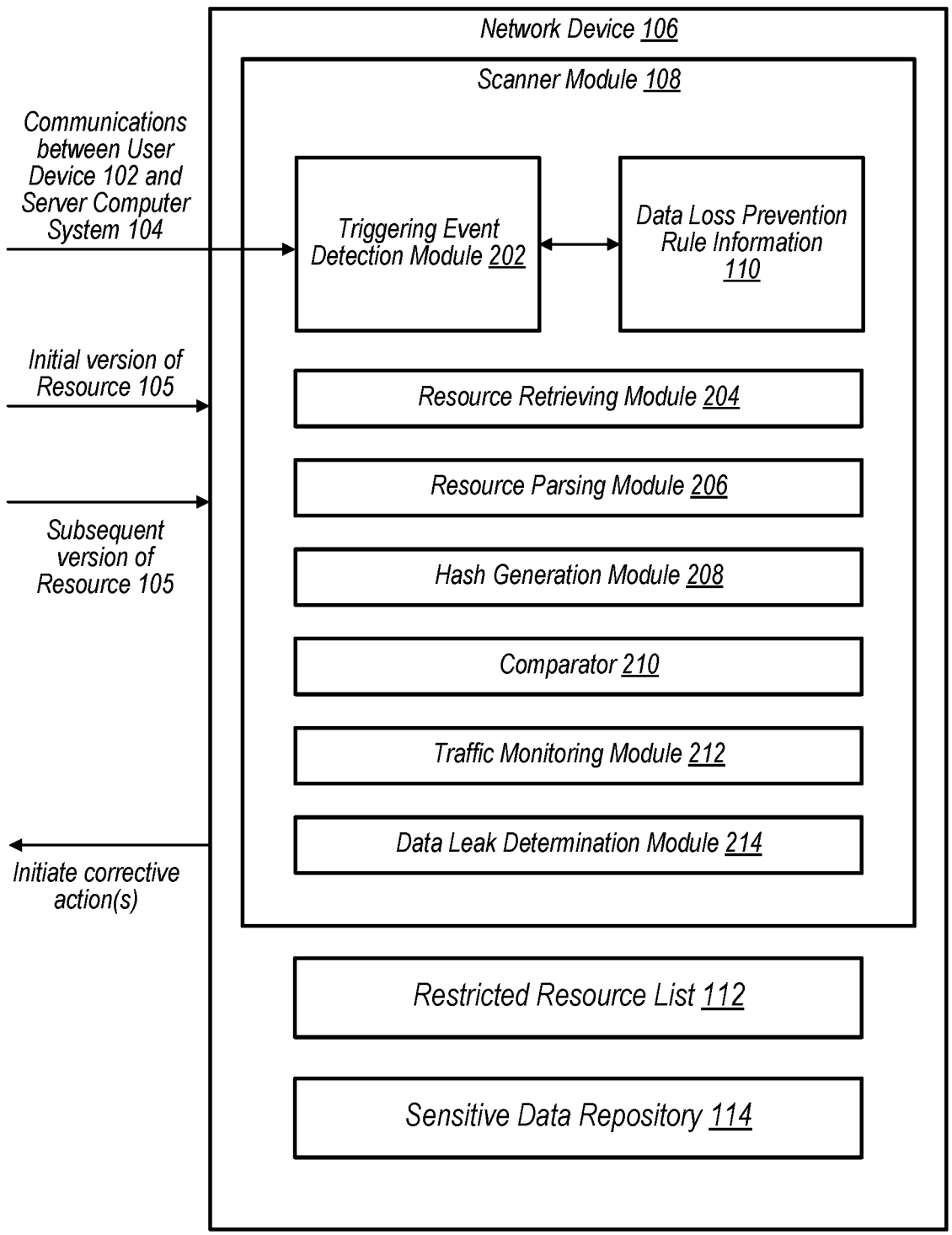
FIG. 2 is a block diagram illustrating an example scanner module, according to some embodiments.

Turning now to FIG. 2, a block diagram illustrating an example scanner module 108 is depicted, according to some embodiments. In various embodiments, scanner module 108 is operable to detect data leaks using targeted scanning. For example, in the depicted embodiment, scanner module 108 monitors communications between user device 102 and server computer system 104 as user 103 accesses resource 105.

As shown in FIG. 2, scanner module 108 includes (or has access to) data loss prevention rule information 110. In various embodiments, data loss prevention rule information 110 specifies one or more data loss prevention rules associated with the organization 120 that are designed to prevent the leaking of sensitive data. Based on the network activity of the users on the network 118 of the organization 120, scanner module 108 is operable to detect if any of the data loss prevention rules have been violated.

In FIG. 2, scanner module 108 includes triggering event detection module 202, which is operable to detect one or more triggering events based on network activity between the user device 102 and the server computer system 104. In various embodiments, scanner module 108 may perform some (or all) of the data loss prevention operations in response to detecting one or more triggering events. In various embodiments, this approach may be more efficient than that taken by prior techniques, discussed above, because rather than attempting to scan all (or a significant portion of) the Internet, scanner module 108 may instead perform targeted scans of the resources and the server computer systems accessed by the devices that are connected to the network 118. As noted above, in various embodiments, data loss prevention rule information 110 includes definitions for one or more triggering events, and triggering event detection module 202 may monitor communications on network 118 to detect the occurrence of any such events.

As noted above, scanner module 108 may perform an initial scan on the resource 105 accessed by user device 102. In the embodiment of FIG. 2, scanner module 108 includes resource retrieving module 204 and resource parsing module 206, which are operable to perform one or more of the operations included in the initial scan. For example, in some embodiments, resource retrieving module 204 captures an initial version of the resource 105 as part of the initial scan. For example, resource retrieving module 204 may store a copy of the resource 105 as it is routed to the user device 102 on the network 118. Alternatively, in some embodiments, resource retrieving module 204 may obtain the initial version by similarly requesting the resource 105 from the server computer system 104 in response to detecting that the resource 105 was requested by the user device 102. Capturing an initial version may include using hashing techniques to reduce the footprint of the resource in a monitoring system, as discussed below.

Further, in various embodiments, the initial scan may include (either instead of or in addition to capturing the initial version of resource 105) scanning the resource 105 to detect the presence of sensitive data. In such embodiments, resource parsing module 206 is operable to parse the resource 105 to determine whether it includes any data from the sensitive data repository 114 upon the establishment of the connection between user device 102 and the server computer system 104. For example, in some embodiments, resource parsing module 206 may utilize regular expressions ("regex") to parse the content of resource 105 to detect the presence of any items of information that are included in the sensitive data repository 114. Note, however, that this embodiment is provided merely as an example and is not intended to limit the scope of the present disclosure. In other embodiments, various other suitable techniques may be used to parse the resource 105 to detect sensitive data. Additionally, in some embodiments the initial scan may include scanning resource 105 to determine if includes one or more input elements that may be used by the user 103 to potentially upload sensitive data. In some embodiments, if no such input elements are present in resource 105, some or all of the data loss prevention operations may be skipped, as resource 105 does not present an opportunity for the leak of sensitive data.

Further, in various embodiments, the data loss prevention operations may include monitoring the communications between devices on network 118 and the server computer systems they access. In the embodiment of FIG. 2, scanner module 108 includes traffic monitoring module 212, which in various embodiments is operable to monitor the communications between the user device 102 and the server computer system 104 for any data that is included in the sensitive data repository 114. In instances in which the connection between the user device 102 and the server computer system 104 is unsecured, traffic monitoring module 212 may monitor the individual packets (including their payloads) sent between the user device 102 and server computer system 104 to identify any items of sensitive data. In some instances, however, the connection between user device 102 and server computer system 104 is secured (e.g., using HTTPS). Note, that, in some such embodiments, scanner module 108 may still be capable of monitoring these secure communications for select websites. For example, the organization 120 may employ an intermediary SSL certificate service for one or more specified websites (e.g., GitHub) that would allow them to decrypt the traffic between the user device 102 and the server computer system 104 that hosts the resource 105. In embodiments in which the connection between the user device 102 and the server computer system 104 is secured and the organization employs man-in-the-middle SSL inspection, scanner module 108 may also scan this secured connection for sensitive data leaks.

Additionally, in various embodiments, scanner module 108 is operable to perform a subsequent scan at a later point in the connection between user device 102 and the server computer system 104. In various embodiments, the subsequent scan may include resource retrieving module 204 capturing a subsequent version of resource 105, as indicated in FIG. 2. Once it has obtained the subsequent version of resource 105, scanner module 108 may determine whether the resource 105 has been modified during the course of the connection between user device 102 and the server computer system 104 to include any sensitive data. For example, as shown in FIG. 2, scanner module 108 may include hash generation module 208, which is operable to generate hash values based on the initial and subsequent versions of resource 105. In some embodiments, hash generation module 208 is operable to perform a hash function (e.g., MD5, SHA-256, etc.) on a selected portion of the initial version of resource 105 to generate a first hash value and perform the same hash function on a corresponding portion of the subsequent version of resource 105 to generate a second hash value. In some embodiments, hash generation module 208 may select certain portions of the resource 105 on which to perform the hash function. For example, in some embodiments, items of dynamic content (e.g., advertisements) of resource 105 may be excluded from the portion of the resource 105 on which the hash function is performed by hash generation module 208. Further, in some embodiments, hash generation module 208 may select only those portions of resource 105 that include elements that could potentially be used to add sensitive data to resource 105, such as a textbox or other input element of the resource 105.

Scanner module 108 further includes comparator 210, which is operable to compare the first and second hash values generated from the initial and subsequent versions of the resource 105. If the first and second hash values are the same, this indicates that the portions of resource 105 on which the hash function was performed are the same and, as such, no sensitive data has been added to the resource 105 during the connection. If, however, the first and second hash values are different, this indicates that the portions of the initial and subsequent versions of resource 105 are not the same and that the resource 105 has been modified during the connection. (In some embodiments, multiple first and second hash values may also be obtained for different portions of a resource, and can likewise be compared to determine if the resource has changed.) If scanner module 108 detects that the initial and subsequent versions of resource 105 are not the same, scanner module 108 may perform one or more additional scans to determine whether this modification to resource 105 is the result of a sensitive data leak. For example, in some embodiments, in response to detecting that resource 105 was modified during the connection, resource parsing module 206 may parse the subsequent version of resource 105 to determine whether this subsequent version includes any data from the sensitive data repository 114. Note that, in some embodiments, the subsequent scan may include scanning the subsequent version of the resource 105 without first generating and the first and second hash values. Further note that, in various embodiments, any of the scanning operations performed by scanner module 108 may include scanning the resource 105 or the communications between the user device 102 and server computer system 104 for both text and unstructured data, such as images or videos. For example, in many instances, images of the content displayed on a user device 102 (e.g., screenshots) may have an increased likelihood of containing items of sensitive data. Accordingly, in various embodiments, the initial scan, the traffic monitoring scan, or the subsequent scan may include detecting the leak of unstructured data, such as screenshots, that may contain sensitive data.

In the depicted embodiment, scanner module 108 further includes data leak determination module 214. In various embodiments, data leak determination module 214 is operable to determine if any of the data loss prevention rules specified by data loss prevention rule information 110 have been violated and, if so, to select and initiate one or more corrective actions. For example, if during the initial scan, scanner module 108 detects that the resource 105 includes one or more items of data from sensitive data repository 114, data leak determination module 214 determine that this occurrence constitutes a violation of a data loss prevention rule. Further, if during the course of the connection between user device 102 and the server computer system 104, the traffic monitoring module 212 determines that sensitive data has been sent from user device 102 to server computer system 104, data leak determination module 214 may similarly determine that this occurrence constitutes a violation of a data loss prevention rule. Additionally, if, based on the initial and subsequent scans, scanner module 108 determines that the resource 105 has been modified to include content from the sensitive data repository 114, data leak determination module 214 may determine that this occurrence constitutes a violation of a data loss prevention rule. Note that the above-listed embodiments are provided merely as examples and are not intended to limit the scope of the present disclosure. In other embodiments, data leak determination module 214 may determine that one or more data loss prevention rules have been violated based on the occurrence of other suitable actions.

In various embodiments, the one or more corrective actions selected and initiated by the data leak determination module 214 may depend on the nature or extent of the sensitive data that was leaked. For example, in some embodiments, data loss prevention rule information 110 may specify a set of corrective actions that may be initiated in response to detecting the violation of a data loss prevention rule. In some embodiments, the same corrective action(s) may be initiated in response to any sensitive data leak. In other embodiments, however, some or all of the corrective actions initiated by scanner module 108 may vary based on the nature or extent of the data leak. For example, data loss prevention rule information 110 may specify the corrective action(s) to initiate for each of multiple different categories of sensitive data. As a non-limiting example, data loss prevention rule information 110 may specify that for leaks of user authentication credentials, scanner module 108 is to initiate the rotation of those credentials for the affected users, and for leaks of information regarding a database table or schema, scanner module 108 is to initiate contact with a particular individual or group (e.g., a cybersecurity team within organization 120). In various embodiments, one or more corrective actions may be initiated by the scanner module 108 for all leaks of sensitive data, in addition to any other corrective actions that may be initiated based on the details of the specific leak involved. For example, in some embodiments, scanner module 108 may initiate contact with certain personnel and initiate takedown operations for all sensitive data leaks that are detected. Note, however, that this embodiment is listed merely as an example and is not intended to limit the scope of the present disclosure.

In some embodiments, data leak determination module 214 may generate a "severity score" for the data leak based on the type or amount sensitive data that was exposed. For example, items of data considered particularly sensitive (e.g., user authentication credentials, credit card information, personally identifying information of users, etc.) may be assigned a higher score than items of data considered to be less sensitive. In various embodiments, data leak determination module 214 may select one or more corrective actions to initiate based on this severity score.

Note that, in various embodiments, the data loss prevention rules may vary based on the user 103 involved. For example, in some embodiments, data loss prevention rule information 110 may include data loss prevention rules that are user specific, team specific, rule specific, function specific, etc. Additionally, in some embodiments, the data that is considered "sensitive data" may vary depending, for example, on the identity of the user 103, the user 103's role within organization 120, the resource 105 being accessed, etc. As one non-limiting example, consider the instance in which user 103 is a software developer for the organization 120. In many instances, software developers may have access to a potentially greater amount of sensitive data than other users within the organization 120 (e.g., support staff). As such, in some embodiments, data loss prevention rule information 110 may include data loss prevention rules that are stricter for users 103 that are designated as having a software development role than for users that have a role with less access to sensitive data.

Figure 3:
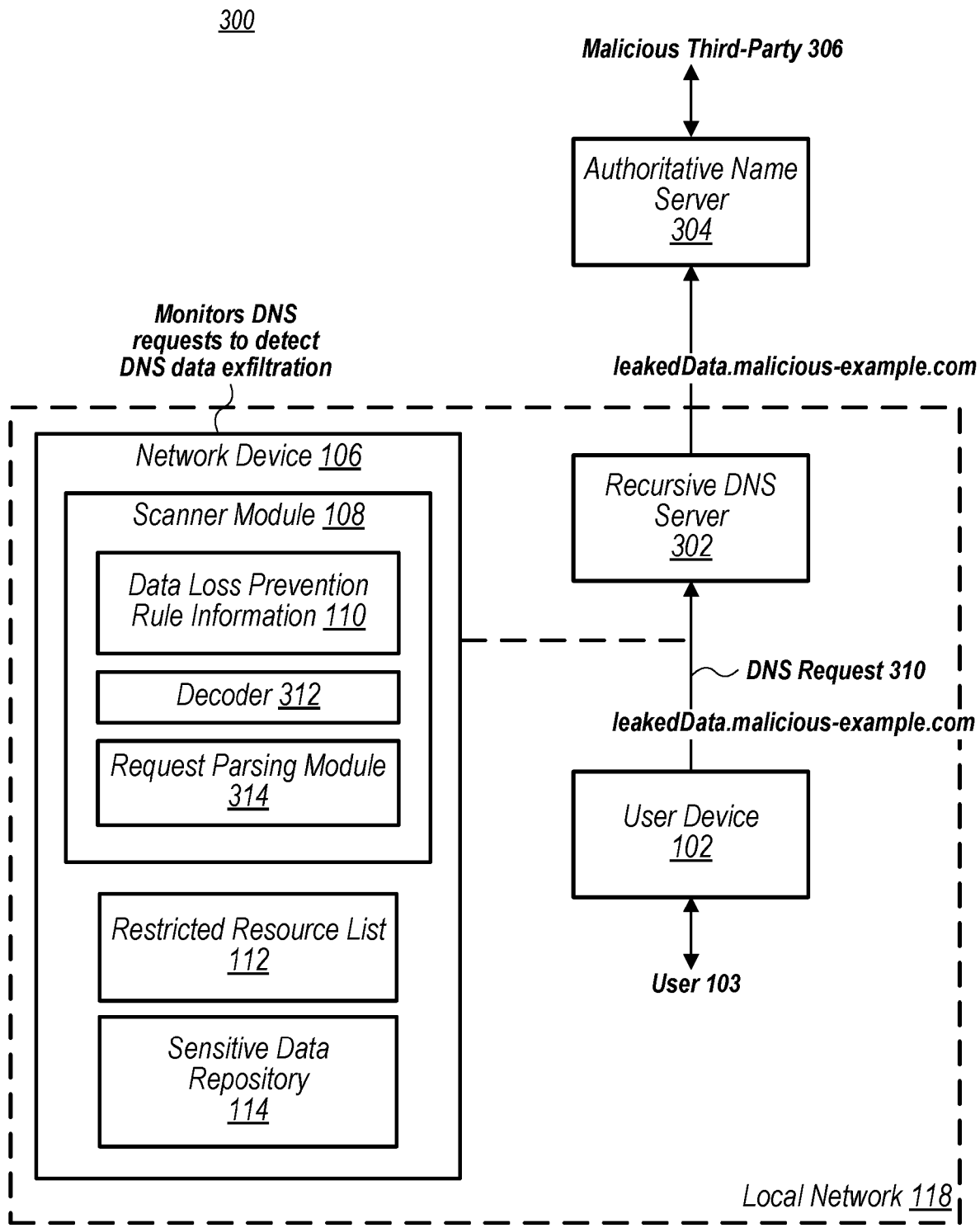
FIG. 3 is a block diagram illustrating a system for detecting data leaks using targeted scanning of DNS requests, according to some embodiments.

Referring now to FIG. 3, a block diagram illustrates a system 300 for detecting data leaks through targeted scanning of DNS requests, according to some embodiments. In FIG. 3, system 300 includes user device 102, network device 106, recursive DNS server 302, and authoritative name server 304. As noted above, sensitive data may be leaked through a technique known as DNS data exfiltration in which items of sensitive data are covertly sent to a malicious third-party 306 as subdomains in a DNS request. For example, as will be appreciated by one of skill in the art, when a given resource (e.g., resource 105) is requested by a user device, the requested resource is typically identified using a human-readable URI, which is then resolved into a machine-readable IP address. This process of resolving URIs into IP addresses is performed by the domain name system (DNS), which includes recursive DNS servers. In the depicted embodiment, network 118 includes its own recursive DNS server 302, which is operable to assist in the process of resolving the URIs of the resources requested by devices on network 118 into a corresponding IP addresses. When a user device 102 on network 118 requests a resource, it sends a DNS request 310 to the recursive DNS server 302. This DNS request 310 includes a URI for the requested resource. Through DNS data exfiltration, items of sensitive data may be embedded into the DNS request 310 to send the sensitive data to a malicious third-party 306. For example, in some embodiments, user device 102 may be infected with malware that is operable to covertly send items of sensitive data to an authoritative name server 304 associated with a malicious third-party 306. In other embodiments, a user 103 of user device 102 may attempt to leak items of sensitive data through such DNS data exfiltration techniques.

Figure 4A:
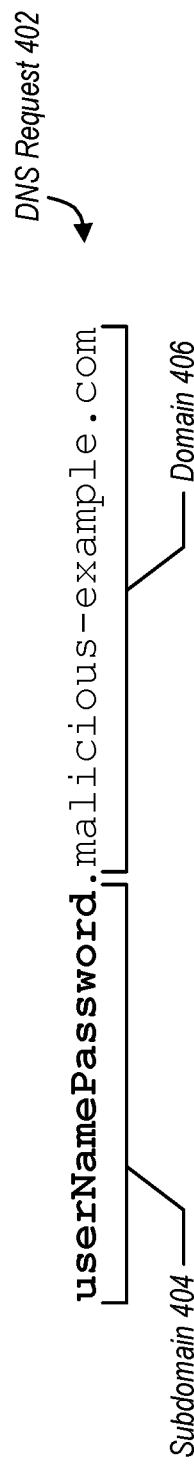
FIGS. 4A-4B illustrate example DNS requests, according to some embodiments.
Figure 4B:
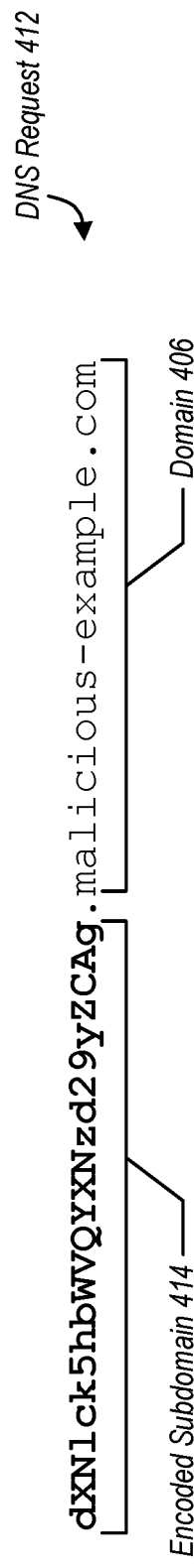

In the embodiment of FIG. 3, DNS request 310 specifies the following hostname: "leakedData.malicious-example.com." In various embodiments, this domain name ("malicious-example.com") may be registered by a malicious third-party 306 and the information included in the subdomain may be used to "exfiltrate" items of sensitive data. Referring briefly to FIGS. 4A-4B, two example DNS requests 402 and 412 are respectively depicted. As shown in FIG. 4A, DNS requests 402 includes a domain 406 ("malicious-example.com") and a subdomain 404 ("userName-Password"). In various embodiments, items of sensitive data may be included in the subdomain 404 to covertly provide this data to the malicious third-party 306. In some embodiments, the items of sensitive data may be encoded to further avoid detection. For example, as shown in FIG. 4B, DNS request 412 includes an encoded subdomain 414, which may be generated by encoding the items of sensitive data using any of various encoding schemes. In the embodiment of FIG. 4B, for example, the subdomain 404 ("userNamePassword") has been encoded using the Base64 encoding scheme to generate the encoded subdomain 414 ("dXNlck5hbW-VQYXNzd29yZCAg"). Note that, in various embodiments, one or more characters from an encoded version of sensitive data may be omitted from the encoded subdomain 414 used in the DNS request 412. For example, in the Base64 encoding scheme, the "=" character is used as a padding character, which may not be suitable for use in a domain name. As such, in some instances, DNS data exfiltration techniques may include padding sensitive data prior to encoding it (e.g., with trailing spaces) to avoid the addition of such padding characters or stripping these padding characters from the encoded subdomain 414 prior to sending the DNS request. Referring again to FIG. 3, once the DNS resolves the DNS request 310 to the authoritative name server 304 associated with "malicious-example.com," the information in that request is routed to the authoritative name server 304. Accordingly the request, with any items of sensitive data embedded therein, is provided to the malicious third-party 306, who may capture and exploit these items of sensitive data.

In various embodiments, the disclosed systems and methods are operable to detect leaking of sensitive data through DNS data exfiltration using targeted scanning. For example, in FIG. 3, scanner module 108 includes decoder 312 and request parsing module 314. In various embodiments, request parsing module 314 is operable to scan the DNS requests sent by devices on network 118 to detect items of sensitive data. For example, request parsing module 314 may parse the subdomains of some or all of the DNS requests sent by the devices on network 118 to detect the presence of any items of data from sensitive data repository 114. If request parsing module 314 detects the presence of an item of sensitive data in a DNS request, data leak determination module 214 may determine that a data loss prevention rule has been violated and may initiate one or more corrective actions, as discussed above.

In some embodiments, scanner module 108 may scan all DNS requests sent from devices on network 118 for the presence of sensitive data. In other embodiments, however, scanner module 108 may only scan a selected portion of DNS requests, such as those associated with certain specific domains (e.g., domains included in the restricted resource list 112), certain users or groups of users, certain types of devices, etc. Further, as noted above, in some instances the sensitive data included in the subdomains may be encoded. In such embodiments, decoder 312 may attempt to decode some or all of the subdomain using at least one of a set of specified encoding schemes. As one non-limiting example, in some embodiments, decoder 312 may attempt to decode the subdomain in the DNS requests based on a Base64 encoding scheme. Note, however, that this embodiment is provided merely as an example and is not intended to limit the scope of the present disclosure. In other embodiments, decoder 312 may utilize any suitable combination of encoding, mapping, or conversion schemes to attempt to detect sensitive data in the DNS requests 310. Non-limiting examples of encoding schemes that may be used include: Base85 encoding, hexadecimal encoding, text-to-ASCII number conversion, substitution ciphers (e.g., ROT13), MD5 or other hash functions (which may be reversed using a rainbow table), etc. As noted above, in some instances the encoding or decoding of a string using an encoding scheme (e.g., Base64) may result in the addition of one or more padding characters to the encoded output (e.g., the "=" character). Accordingly, in various embodiments, decoder 312 is operable to strip padding characters from the decoded subdomains, as necessary, to facilitate the detection of leaked sensitive data through DNS data exfiltration. Note that, in some embodiments, if scanner module 108 detects the presence of one or more items of sensitive data in a DNS request 310, scanner module 108 may add a domain included in that request 310 to the restricted resource list 112, instead of or in addition to any other corrective actions that may be initiated.

Referring now to FIG. 5, a flow diagram illustrating an example method 500 for detecting data leaks using targeted scanning is depicted, according to some embodiments. In various embodiments, method 500 may be performed by scanner module 108 of FIG. 1 to perform targeted scanning of communications between user device 102 and server computer system 104 as the user 103 accesses resource 105. For example, network device 106 may include (or have access to) a non-transitory, computer-readable medium having program instructions stored thereon that are executable by the scanner module 108 to cause the operations described with reference to FIG. 5. In FIG. 5, method 500 includes elements 502-512. Although these elements are shown in a particular order for ease of understanding, other orders may be used. In various embodiments, some of the method elements may be performed concurrently, in a different order than shown, or may be omitted. Additional method elements may also be performed as desired. Accordingly, some or all portions of the method of FIG. 5 may be performed by network device 106, user device 102, or another computing device, according to various embodiments.

At 502, in the illustrated embodiment, the scanner module 108 monitors communications, between a user device and a server system, in which the user device requests access to a first resource provided via the server system. For example, with reference to FIG. 1, scanner module 108 may monitor communications between user device 102 and server computer system 104 as the user device 102 requests access to resource 105.

At 504, in the illustrated embodiment, scanner module performs data loss prevention operations in response to detecting a triggering event associated with the communications between the user device and the server system. In some embodiments, detecting a triggering event may include comparing the first resource to a set of restricted resources. For example, scanner module 108 may compare the resource 105 with the restricted resource list 112 to determine whether the requested resource 105 has been identified by the organization 120 as one that is to be restricted. In other embodiments, detecting a triggering event may include determining that the user device has attempted to upload content belonging to a specified restricted category of content. For example, in some instances, organization 120 may identify certain categories of content as restricted, such as images, program code, videos, cryptographic key values (e.g., Secure Shell (SSH) keys), etc. In such embodiments, scanner module 108 may detect a triggering event upon detecting that the user device 102 has uploaded content belonging to one of these restricted categories, such as a screenshot.

In the depicted embodiment, element 504 includes subelements 506-510. Note, however, that this embodiment is provided merely as an example and is not intended to limit the scope of the present disclosure. In other embodiments, additional method elements may also be performed as part of the data loss prevention operations of element 504. At 506, in the depicted embodiment, the scanner module performs an initial scan of the first resource, where the initial scan captures an initial version of the first resource. For example, as discussed above with reference to FIG. 2, resource retrieving module 204 may retrieve an initial version of resource 105 in response to detecting that this resource has been requested by user device 102. In some embodiments, the initial scan may further include parsing at least a portion of the first resource to determine whether the first resource includes any data from a particular set of sensitive data upon the establishment of the connection. For example, resource parsing module 206 may parse the resource 105 to determine whether it includes any items of data from the sensitive data repository 114 at the beginning of the connection between user device 102 and the server computer system 104.

In some embodiments, the set of sensitive data against which the resource 105 is compared may vary depending, for example, on the user 103 or the resource 105. For example, in some embodiments, the particular set of sensitive data is selected based on an identity of the user 103 of user device 102. In other embodiments, the particular set of sensitive data is selected based on the resource 105. In still other embodiments, the particular set of sensitive data is selected based on a role of the user 103 within the organization 120. Note that, in some embodiments, scanner module 108 may perform one or more targeted scans during the course of the connection between user device 102 and server computer system 104. For example, in some embodiments, the data loss prevention operations of element 504 may further include monitoring, during the connection, one or more of the communications sent between the user device 102 and the server computer system 104 for any data from the sensitive data repository 114. Additionally, in some embodiments, the data loss prevention operations may further include scanning a subdomain associated with the resource 105 to determine whether the subdomain includes any data from the sensitive data repository 114, as described in more detail below with reference to FIG. 7.

At 508, in the depicted embodiment, the scanner module performs a subsequent scan that captures a subsequent version of the first resource. For example, resource retrieving module 204 may retrieve a subsequent version of resource 105 at a point after the establishment of the connection between user device 102 and the server computer system 104. At 510, in the illustrated embodiment, the scanner module determines whether any of the set of data loss prevention rules were violated based on the initial and subsequent scans, as described in more detail below with reference to FIG. 6.

At 512, in the illustrated embodiment, the scanner module initiates one or more corrective actions in response to one or more of the set of data loss prevention rules being violated. As noted above, in some embodiments, scanner module 108 is operable to generate a severity score based on the one or more data loss prevention rules that were violated. For example, if the data that was exposed was considered to be particularly sensitive or if the extent of the data leak is expansive, the data leak may be given a relatively high severity score. In various embodiments, scanner module 108 may select one or more corrective actions to initiate based on the severity score. For example, for leaks of sensitive data that are considered to be more severe, scanner module 108 may initiate multiple corrective actions in parallel in an attempt to remediate the effects of the data leak.

Turning now to FIG. 6, a flow diagram illustrating an example method 600 that may be performed to implement sub-element 510 of FIG. 5 is depicted, according to some embodiments. In various embodiments, method 600 may be performed by scanner module 108 of FIG. 1 to determine whether any of a set of data loss prevention rules were violated. For example, network device 106 may include (or have access to) a non-transitory, computer-readable medium having program instructions stored thereon that are executable by the scanner module 108 to cause the operations described with reference to FIG. 6. In FIG. 6, method 600 includes elements 602-608. Although these elements are shown in a particular order for ease of understanding, other orders may be used. In various embodiments, some of the method elements may be performed concurrently, in a different order than shown, or may be omitted. Additional method elements may also be performed as desired. Accordingly, some or all portions of the method of FIG. 5 may be performed by network device 106, user device 102, or another computing device, according to various embodiments.

At 602, in the illustrated embodiment, the scanner module performs a hash function on a portion of the initial version of the first resource to generate a first hash value. For example, as described above, hash generation module 208 may perform a hash function on an initial version of resource 105 to generate a first hash value. At 604, in the illustrated embodiment, the scanner module performs a hash function on a portion of the subsequent version of the first resource to generate a second hash value. For example, in some embodiments, the hash generation module 208 may perform the same hash function on a corresponding portion of the subsequent version of resource 105 to generate a second hash value.

At 606, in the illustrated embodiment, the scanner module compares the first and second hash values to determine whether the first resource was modified with content added by a user of the user device during a connection between the user device and the server computer system. For example, comparator 210 may compare the first and second hash values to determine whether they are equal. If the two hash values do compare equally, this indicates that the portion of the resource 105 on which the hash function was performed was the same in both the initial and subsequent version of resource 105. If, however, the first and second hash values do not compare equally, this indicates that some aspect of the portion of the subsequent version of resource 105 on which the hash function was performed was changed relative to that same portion in the initial version of resource 105. At 608, in the illustrated embodiment, the scanner module, in response to detecting that the first resource was modified during the connection, parses the subsequent version of the first resource to determine whether the subsequent version was modified to include sensitive data. As noted above, in some embodiments, user 103 may upload content belonging to a monitored category of content, such as an image. In some embodiments, in response to detecting that the user device 102 has uploaded an image to the resource 105, scanner module 108 may perform optical character recognition (OCR) operations on the image to facilitate the determination of whether any data loss prevention rules have been violated.

Referring now to FIG. 7, a flow diagram illustrating an example method 700 for detecting data leaks using targeted scanning of DNS requests is depicted, according to some embodiments. In various embodiments, method 700 may be performed by scanner module 108 of FIG. 3 to detect attempts to leak sensitive data through DNS data exfiltration. For example, network device 106 may include (or have access to) a non-transitory, computer-readable medium having program instructions stored thereon that are executable by the scanner module 108 to cause the operations described with reference to FIG. 7. In FIG. 7, method 700 includes elements 702-708. Although these elements are shown in a particular order for ease of understanding, other orders may be used. In various embodiments, some of the method elements may be performed concurrently, in a different order than shown, or may be omitted. Additional method elements may also be performed as desired. Some or all portions of the method of FIG. 5 may be performed by network device 106, user device 102, or another computing device, according to various embodiments.

At 702, in the illustrated embodiment, the scanner module receives information indicative of network activity of a user device, wherein the network activity includes one or more DNS requests, sent by the user device, associated with the first domain. For example, scanner module 108 may receive information indicative of a DNS request 310 sent by user device 102. At 704, in the illustrated embodiment, the scanner module performs data loss prevention operations where, for a given DNS request, the data loss prevention operations include sub elements 706-708. Note, however, that this embodiment is provided merely as an example and is not intended to limit the scope of the present disclosure. In other embodiments, additional method elements may also be performed as part of the data loss prevention operations of elements 704.

At 706, in the illustrated embodiment, scanner module 108 scans a subdomain of the given DNS request to determine whether the subdomain includes any data from a particular set of sensitive data. For example, request parsing module 314 may scan the subdomain included in DNS request 310 to determine whether it includes any data from the sensitive data repository 114. As noted above, in some embodiments, the data contained in the subdomain may be encoded, in some instances. In various embodiments, elements 706 may include decoding the subdomain using at least one of a set of specified encoding schemes and, subsequent to the decoding, parsing the decoded subdomain to determine whether the decoded subdomain includes any data from the particular set of sensitive data.

At 708, in the illustrated embodiment, the scanner module initiates one or more corrective actions in response to determining that the subdomain of the given DNS request includes sensitive data. In various embodiments, in response to determining that the subdomain includes data from the particular set of sensitive data, method 700 may include updating a set of restricted resources (e.g., restricted resource list 112) to include the first domain. Further, in various embodiments, in response to determining that the subdomain includes data from the particular set of sensitive data, method 700 may further include parsing the information indicative of the network activity to identify all DNS requests, sent by the user device, that are associated with the first domain. For example, in response to detecting DNS data exfiltration operations associated with "malicious-example.com" by the user device 102, scanner module 108 may parse information indicative of historical network activity to identify all communications between the user device 102 and devices associated with this domain.

Example Computer System

Figure 8:
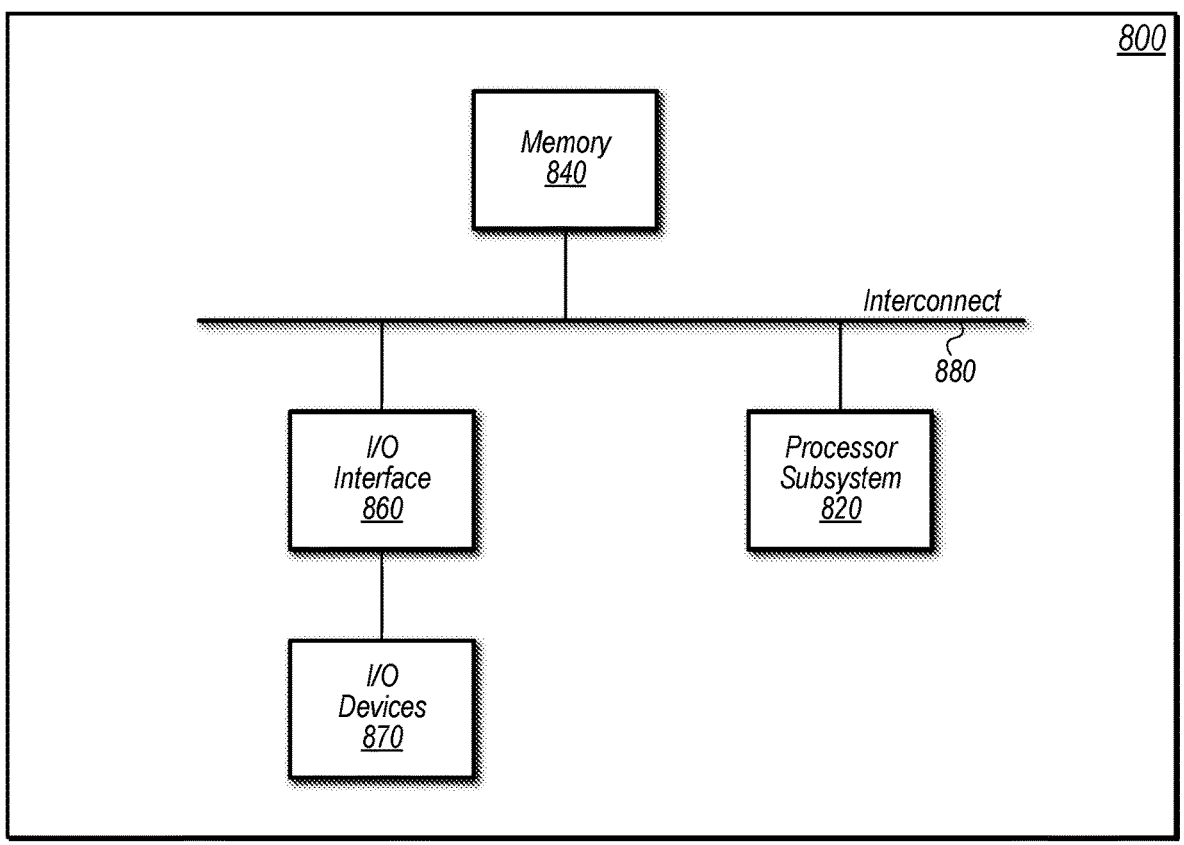
FIG. 8 is a block diagram illustrating an example computer system, according to some embodiments.

Referring now to FIG. 8, a block diagram of an example computer system 800 is depicted, which may implement one or more computer systems, such as user device 102, network device 106, or server computer system 104 of FIG. 1, according to various embodiments. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause system 800 perform various operations described herein. System memory 840 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage on I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over WiFi, Bluetooth, Ethernet, etc.), and computer system 800 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., scanner module 108, triggering event detection module 202, comparator 210, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardware circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    monitoring communications, between a user device and a server system, among which the user device requests access to a first resource hosted by the server system;
    capturing an initial version of the first resource, wherein the initial version of the first resource includes content of the first resource at a first time corresponding to an establishment of a connection between the user device and the server system;
    performing a hash function on a portion of the initial version of the first resource to generate a first hash value;
    performing, by a computer system, data loss prevention operations that include:
        in response to detecting a triggering event caused by an action of the user device and associated with the communications between the user device and the server system, capturing a subsequent version of the first resource hosted by the server system, wherein the subsequent version of the first resource includes the content of the first resource at a second, subsequent time after at least a portion of the connection between the user device and the server system;
        performing the hash function on a portion of the subsequent version of the first resource to generate a second hash value, wherein the portion of the subsequent version corresponds to the portion of the initial version;
        comparing the first hash value and second hash value to determine whether the first resource was modified with content added by the user device during the connection between the user device and the server system; and based on the comparing, determining whether any of a set of data loss prevention rules were violated; and in response to one or more of the set of data loss prevention rules being violated, initiating one or more corrective actions.

2. The method of claim 1, further comprising selecting the portion of the initial version of the first resource, wherein selecting the portion comprises one or more of excluding dynamically-changing content of the first resource or including input elements of the first resource.

3. The method of claim 1, wherein the determining whether any of the set of data loss prevention rules were violated includes:

in response to detecting that the first resource was modified during the connection, parsing the subsequent version of the first resource to determine whether the subsequent version includes any data from a particular set of sensitive data.

4. The method of claim 3, wherein the particular set of sensitive data is selected based on an identity of a user of the user device.

5. The method of claim 3, wherein the particular set of sensitive data is selected based on the first resource.

6. The method of claim 1, wherein the detecting the triggering event includes:

comparing the first resource to a set of restricted resources.

7. The method of claim 1, wherein detecting the triggering event includes:

determining that the user device has attempted to upload content belonging to a specified restricted category of content.

8. The method of claim 1, wherein the capturing the initial version further includes:

parsing at least a portion of the first resource to determine whether the first resource includes any data from a particular set of sensitive data upon the establishment of the connection.

9. The method of claim 1, wherein the data loss prevention operations further include:

during the connection, monitoring one or more of the communications between the user device and the server system for any data from a particular set of sensitive data.

10. A non-transitory, computer-readable medium having instructions stored thereon that are capable of execution by a computer system to perform operations comprising:

monitoring communications, between a user device and a server system, among which the user device requests access to a first resource hosted by the server system;

in response to detecting a triggering event caused by an action of the user device and associated with the communications between the user device and the server system, performing data loss prevention operations that include:

capturing an initial version of the first resource, wherein the initial version of the first resource includes content of the first resource at a first time corresponding to an establishment of a connection between the user device and the server system;

performing a hash function on a portion of the initial version of the first resource to generate a first hash value;

capturing a subsequent version of the first resource hosted by the server system, wherein the subsequent version of the first resource includes the content of the first resource at a second, subsequent time after at least a portion of the connection between the user device and the server system;

performing the hash function on a portion of the subsequent version of the first resource to generate a second hash value, wherein the portion of the subsequent version corresponds to the portion of the initial version;

comparing the first hash value and second hash value to determine whether the first resource was modified with content added by the user device during the connection between the user device and the server system; and based on the comparing, determining whether any of a set of data loss prevention rules were violated; and in response to one or more of the set of data loss prevention rules being violated, initiating one or more corrective actions.

11. The non-transitory, computer-readable medium of claim 10, wherein the data loss prevention operations further include:

scanning a subdomain associated with the first resource to determine whether the subdomain includes any data from a particular set of sensitive data.

12. The non-transitory, computer-readable medium of claim 10, wherein the operations further comprise:

in response to a determination that any of the set of data loss prevention rules were violated, generating a severity score based on specific data loss prevention rules that were violated; and selecting the one or more corrective actions to initiate based on the severity score.

13. The non-transitory, computer-readable medium of claim 10, further comprising selecting the portion of the initial version of the first resource, wherein selecting the portion comprises one or more of excluding dynamically-changing content of the first resource or including input elements of the first resource.

14. The non-transitory, computer-readable medium of claim 10, wherein the determining whether any of the set of data loss prevention rules were violated includes:

in response to detecting that the first resource was modified during the connection, parsing the subsequent version of the first resource to determine whether the subsequent version was modified to include content belonging to a specified restricted category of content.

15. The non-transitory, computer-readable medium of claim 10, wherein the capturing the initial version further includes:

parsing at least a portion of the first resource to determine whether the first resource includes any data from a particular set of sensitive data upon the establishment of the connection.

16. The non-transitory, computer-readable medium of claim 15, wherein the particular set of sensitive data is selected based on a role of a user of the user device.

17. A system, comprising:

at least one processor;

a non-transitory, computer-readable medium having instructions stored thereon that are executable by the at least one processor to cause the system to:

monitor communications, between a user device and a server system, among which the user device requests access to a first resource hosted by the server system;

capture an initial version of the first resource, wherein the initial version of the first resource includes content of the first resource at a first time corresponding to an establishment of a connection between the user device and the server system;

perform a hash function on a portion of the initial version of the first resource to generate a first hash value;

perform data loss prevention operations that include:
  in response to detecting a triggering event caused by an action of the user device and associated with the communications between the user device and the server system, capturing a subsequent version of the first resource hosted by the server system, wherein the subsequent version of the first resource indicates the content of the first resource at a second, subsequent time after at least a portion of the connection between the user device and the server system;
  performing the hash function on a portion of the subsequent version of the first resource to generate a second hash value, wherein the portion of the subsequent version corresponds to the portion of the initial version;
  comparing the first hash value and second hash value to determine whether the first resource was modified with content added by the user device during the connection between the user device and the server system; and
  based on the comparing, determining whether any of a set of data loss prevention rules were violated; and
  in response to one or more of the set of data loss prevention rules being violated, initiate one or more corrective actions.

18. The system of claim 17, further comprising selecting the portion of the initial version of the first resource, wherein selecting the portion comprises one or more of excluding dynamically-changing content of the first resource or including input elements of the first resource.

19. The system of claim 17, wherein the determining whether any of the set of data loss prevention rules were violated includes:
  in response to detecting that the first resource was modified during the connection, parsing the subsequent version of the first resource to determine whether the subsequent version includes any data from a particular set of sensitive data.

20. The system of claim 17, wherein the detecting the triggering event includes:
  comparing the first resource to a set of restricted resources.

* * * * *